3,153,117
ELECTRICAL SYSTEM FOR LOOMS OR THE LIKE
Robert L. Hill, P.O. Box 48, Anderson, S.C.
Filed Aug. 14, 1962, Ser. No. 216,800
4 Claims. (Cl. 174—40)

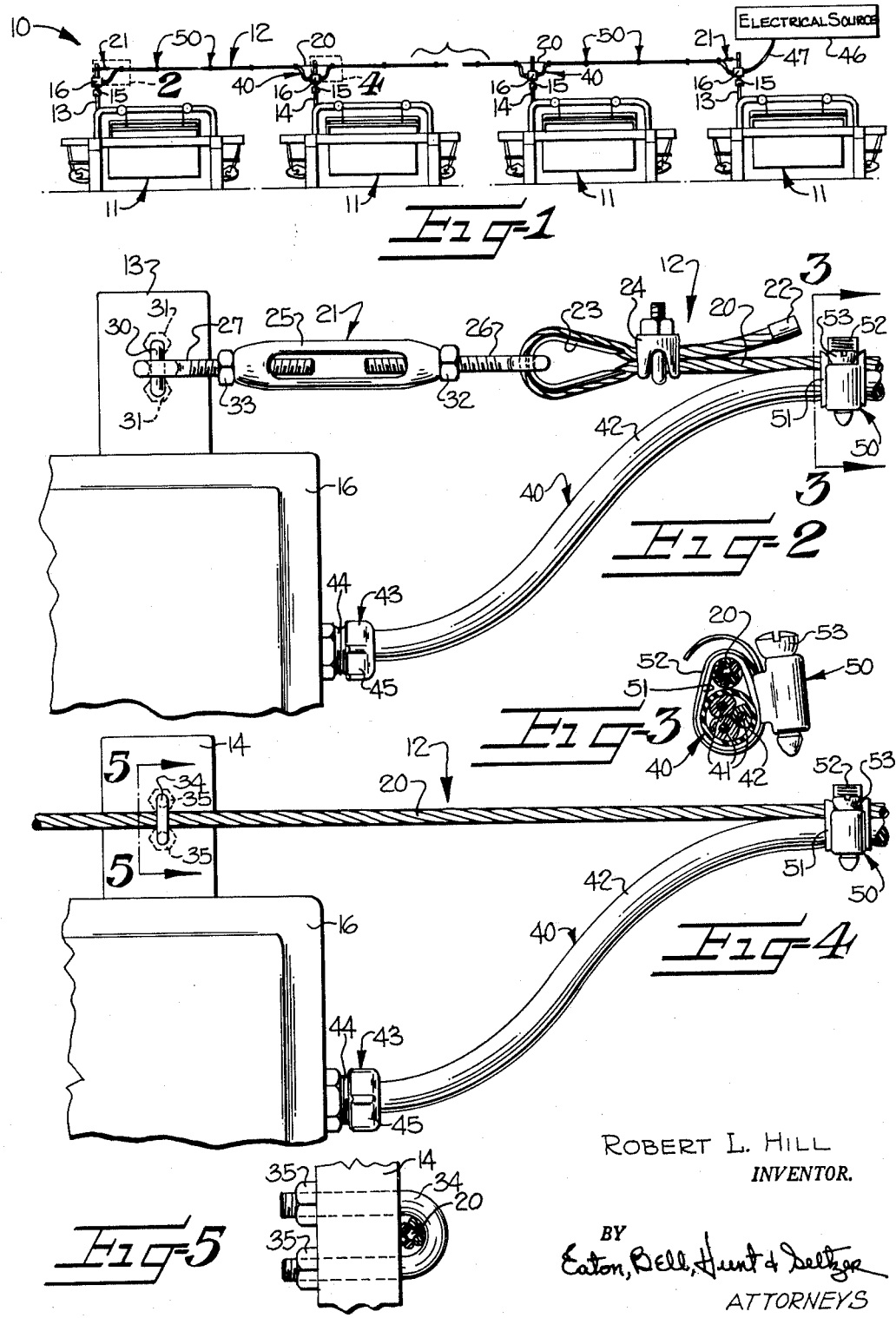

The present invention relates to textile looms or similar machines having considerable vibration during the operation thereof and more particularly to an improved electrical system therefor.

In the manufacturing field and particularly in the textile manufacturing art, there are several different types of machines having considerable vibration during the operation thereof. This is particularly true with textile looms which are usually prearranged in rows of spaced apart looms with 10 to 12 looms being common in a row. The vibration of these looms is considerable, as is well known, and creates many problems in the operation and maintenance of the looms and associated mechanisms.

In this regard, looms are normally driven by individual electric motors mounted on the loom frames, which electric motors are supplied with electrical energy by an electrical system. Conventionally, this electrical system comprises suitable standards mounted on each of the spaced apart looms and usually having switches mounted thereon which are connected by suitable conduits to junction boxes also mounted on the standards above the switches. The junction boxes on the spaced standards are connected by rigid conduits through which are threaded the electrical conductors for supplying electrical energy to the motors of the looms. The electrical conductors are connected to a suitable electrical source at one end and are connected to the switches mounted below the junction boxes in conventional manner with the switches in turn being connected to the electric motors of the looms.

In this conventional system, the vibration of the looms is transmitted to the conduits through the standards and junction boxes mounted thereon and, because of the rigid nature thereof, the conduits transmit this vibration thereaIong to the standards of the other looms. Quite often, this transmitted vibration loosens the connections between the conduits and the junction boxes which interferes with the electrically grounded nature of the system and frequently damages the electrical conductors extending through the conduits. Also, this vibration causes relative movement between the conduits and the electrical conductors passing therethrough and results in increased wear on the insulation on the electrical conductors and thus, considerably shortens the life of the electrical conductors.

It is therefore an object of the present invention to provide an improved electrical system for machines, such as textile looms or the like, having considerable vibration during operation wherein the aforementioned problems encountered in conventional systems are obviated and wherein the vibration transmitted to the electrical system from the looms is dampened.

A more specific object of the present invention is to provide an improved electrical system of the character described which has increased operative life with considerable less maintenance required and which is so constructed and arranged to prevent the vibrations of the looms on which the same is mounted from having a deleterious effect thereon.

Some of the objects of the invention having been stated, other objects will appear as the description proceeds when taken in connection with the accompanying drawings, in which—

FIGURE 1 is a front elevational view with portions broken away of a row of textile looms with the improved electrical system of the present invention mounted thereon;

FIGURE 2 is an enlarged fragmentary elevational view of the structure within the dotted line rectangle indicated at 2 in FIGURE 1;

FIGURE 3 is a sectional view taken substantially along line 3—3 in FIGURE 2;

FIGURE 4 is a view similar to FIGURE 2 of the structure within dotted line rectangle indicated at 4 in FIGURE 1; and FIGURE 5 is a fragmentary sectional view taken substantially along line 5—5 in FIGURE 4.

Referring now to the drawings, and more particularly to FIGURE 1, a row of textile looms is generally indicated at 10 and includes a plurality of looms 11 prearranged in spaced relation. Looms 11 are of conventional construction and therefore the specific construction thereof will not be described herein.

The improved electrical system of the present invention is generally indicated at 12 and comprises a pair of upstanding end standards 13 mounted on the end looms 11 in the row of looms 10 and a plurality of intermediate standards 14 mounted on the intermediate looms 11 in the row of looms 10. It is noted that standards 13 and 14 are constructed of electrically conductive material and are mounted on the frames of looms 11 in such a manner that the same are electrically grounded thereto.

A switch box 15 is mounted on each of the standards 13 and 14 and includes switches (not shown) therein which are connected to the looms 11 in a manner not shown. A junction box 16 is mounted on each of the standards 13 and 14 above switch boxes 15 and junction boxes 16 are electrically connected to switch boxes 15 in conventional manner.

A flexible elongate cable 20 is connected at opposite ends to end standards 13 by turn buckles 21 and extends therebetween preferably in a taut condition. Cable 20 is preferably constructed of a plurality of steel wires tightly twisted together with opposite ends of the cable held against untwisting by suitable end caps 22. Opposite ends of the cable 20 are preferably bent back upon themselves to form loops around U-shaped wear guards 23 and are secured in this shape by U-bolt clamps 24 of conventional construction.

Turn buckles 21 include a body portion 25 having internally threaded holes at each end. A first externally threaded member 26 is mounted in the hole at one end of body portion 25 and has a hook portion at its outer end which extends around the bight portion of the loop in the end of cable 20 and around the U-shaped wear guard 23. A second externally threaded member 27 is threadably mounted in the hole at the other end of body portion 25 and includes a hook portion at its outer end which is connected to the bight portion of a U-bolt 30. The legs of U-bolt 30 extend through suitable openings formed in the end standard 13 and are held therein by nuts 31 threadably received thereon.

It is noted that the tension in cable 20 may be varied by turning body portions 25 of turn buckles 21 in the appropriate direction to move threaded members 26 and 27 toward or away from each other. Lock nuts 32, 33 are threadably mounted on members 26, 27, respectively, for locking the same in adjusted position. Cable 20 is secured to intermediate standards 14 by U-bolts 34 which have the leg portions thereof extending through spaced openings in standards 14 and having suitable nuts 35 threadably received thereon to cooperate with the bight portion of U-bolts 34 to clamp cable 20 against intermediate standards 14.

An electrical conductor 40, preferably of the type commonly referred to as bus drop cable, comprising a plurality of electrically conductive wires 41 surrounded by an insulating sheath 42 is connected at each end to a pair of junction boxes 16 by strain relief connections 43. Strain relief connections 43 are of conventional construction and each connection comprises a threaded nipple 44 threadably mounted in the side of junction box 16 and has a rubber thimble (not shown) therein which frictionally receives the end of electrical conductor 40 therein. A cap 45 is threadably mounted on nipple 44 and clamps the rubber thimble therein against conductor 40 to resiliently hold the end of conductor 40 in junction box 16.

Electrical conductors 40 are connected together and to the switch boxes 15 by suitable relays (not shown) as is conventional in electrical systems of this type. Also, the junction box 16 on one of the end standards 13 is connected to a suitable electrical source 46 by a line 47 to supply electrical energy to the electrical conductors 40.

Electrical conductors 40 are secured to cable 20 at spaced points intermediate the ends thereof by clamps 50. Each of the clamps 50 comprises an insulating sheath 51 which extends about the conductor 40 and cable 20, an adjustable band 52 extending around sheath 51 and an adjusting mechanism 53 connected to band 52 for adjusting the same to clampingly secure the conductor 40 to cable 20. While it is preferable to connect connect conductors 40 to cable 20 every few feet, it is noted that the number of points that the same is connected to the cable 20 may vary considerably without departing from the scope of the present invention. It is also noted that conductors 40 may be connected directly to switch boxes 15 and junction boxes 16 may be thereby omitted without departing from the present invention.

It will therefore be apparent that an improved electrical system for looms or similar machines having considerable vibration during operation is provided wherein the vibration transmitted to the electrical system from the looms is dampened to prevent the same from having a deleterious effect on the electrical conductors and associated elements and to prevent the transfer thereof between the various looms.

In the drawings and specification there has been set forth a preferred embodiment of the invention and, although specific terms are employed, they are used in a generic and descriptive sense only and not for purposes in limitation, the scope of the invention being defined in the claims.

I claim:

1. In a plurality of prearranged, spaced apart machines such as textile looms or the like having considerable vibration during operation thereof; the combination of an electrical system therefor comprising
    (a) flexible means extending between and above said machines,
    (b) supporting means mounted on each of said machines and extending upwardly therefrom and supporting said flexible means thereon,
    (c) electrical conductor means extending between said supporting means and supplying electrical energy to the machines, and
    (d) means securing said electrical conductor means to said flexible means at spaced points.

2. In a plurality of prearranged, spaced apart machines such as textile looms or the like having considerable vibration during operation thereof; the combination of an electrical system therefor comprising
    (a) a plurality of bracket means mounted on and electrically grounded to said machines,
    (b) flexible means mounted on and electrically grounded to said plurality of bracket means and extending therebetween in a predetermined tensioned condition,
    (c) electrical conductors extending between said bracket means in an untensioned condition and supplying electrical energy to the machines, and
    (d) means securing said electrical conductors to said flexible means at spaced points between said bracket means.

3. In a plurality of spaced apart looms or the like having considerable vibration during operation; the combination of an electrical system for said looms comprising
    (a) a standard mounted on and electrically grounded to each of said looms and extending upwardly therefrom,
    (b) a flexible cable extending between and mounted on said standards above said looms in a predetermined tensioned condition, said flexible cable being electrically grounded to said standards and thereby to said looms,
    (c) electrical conductors extending between adjacent standards in an untensioned condition and being electrically connected to said looms for delivering electrical current thereto, and
    (d) means securing said electrical conductors to said flexible cable at spaced points between said standards with said electrical conductors being supported by said cable in an untensioned condition, said flexible cable dampening the vibrations transmitted thereto from said looms to prevent the same from having a deleterious effect upon said electrical conductors.

4. In a plurality of spaced apart looms or the like having considerable vibration during operation; the combination of an electrical system for said looms comprising
    (a) a standard mounted on and electrically grounded to each of said looms and extending upwardly therefrom,
    (b) a flexible cable extending between and mounted on said standards above said looms in a predetermined tensioned condition, said flexible cable being electrically grounded to said standards and thereby to said looms,
    (c) electrical conductor means extending between said standards in an untensioned condition,
    (d) switch means mounted on each of said standards and being connected to said electrical conductor means, said switch means also being connected to said looms for delivering electrical current thereto, and
    (e) insulated clamp means clamping said electrical conductor means to said flexible cable at spaced points between said standards with said electrical conductor means being supported by said cable in an untensioned condition, said flexible cable dampening the vibrations transmitted thereto from said looms to prevent the same from having a deleterious effect upon said electrical conductors.

References Cited by the Examiner

UNITED STATES PATENTS

| | | | |
|---|---|---|---|
| 714,718 | 12/02 | Locke | 174—41 |
| 2,390,192 | 12/45 | St. Clair | 174—43X |
| 2,870,237 | 1/59 | Wilkins et al. | 174—41 |

JOHN P. WILDMAN, *Examiner.*